United States Patent [19]
Wiggins et al.

[11] Patent Number: 5,471,981
[45] Date of Patent: Dec. 5, 1995

[54] METHOD AND APPARATUS FOR CONVERTING A MODULATED OPTICAL SIGNAL TO AN ELECTRICAL SIGNAL WITH CORRECTION FOR MODULATION JITTER

[75] Inventors: Richard L. Wiggins; Dean Grinch, both of Indiana, Pa.

[73] Assignee: Diasense, Inc., Pittsburgh, Pa.

[21] Appl. No.: 176,276

[22] Filed: Dec. 30, 1993

[51] Int. Cl.$^6$ .................................................. A61B 5/00
[52] U.S. Cl. ................................. 128/633; 356/39
[58] Field of Search ................................. 128/632–634, 128/664–667; 356/39–41

[56] References Cited

U.S. PATENT DOCUMENTS

| | | | |
|---|---|---|---|
| 4,167,331 | 9/1979 | Nielsen | 128/633 X |
| 4,225,791 | 9/1980 | Kompelien | 250/574 |
| 4,731,529 | 3/1988 | Ohsawa | 250/214 |
| 4,800,885 | 1/1989 | Johnson | 128/633 |
| 4,807,630 | 2/1989 | Malinouskas | 128/633 |
| 4,855,687 | 8/1989 | Hebert | 330/304 |
| 4,972,331 | 11/1990 | Chance | 128/633 X |
| 5,006,814 | 4/1991 | Wilson | 330/107 |
| 5,008,526 | 4/1991 | Green | 250/214 |
| 5,213,105 | 5/1993 | Gratton et al. | 128/665 X |

FOREIGN PATENT DOCUMENTS

| | | | |
|---|---|---|---|
| 0555508 | 2/1992 | European Pat. Off. | 21/59 |
| 56-00625 | 1/1981 | Japan | G01J 5/06 |

OTHER PUBLICATIONS

I. Mendas and P. Vujkovic Cvijin, Applied Physics B, vol. B32, No. 3, "Waveform of the Amplitude Modulated Laser Light by Means of a Mechanical Chopper", 1983, pp. 119–122.

*Primary Examiner*—Angela D. Sykes
*Attorney, Agent, or Firm*—Webb Ziesenheim Bruening Logsdon Orkin & Hanson

[57] ABSTRACT

A method for accurately converting to an electrical signal a modulated optical signal, the modulation frequency of which randomly varies in a narrow range about a predefined optimum modulation frequency, includes the steps of receiving the optical signal at an optical detector, producing as an output of the optical detector an electrical signal corresponding to the optical signal, the amplitude of which electrical signal varies with frequency, and modifying the amplitude of the electrical signal, depending on the frequency of the electrical signal, inversely to the variation of the amplitude of the electrical signal with frequency caused by the optical detector.

16 Claims, 3 Drawing Sheets

METHOD AND APPARATUS FOR CONVERTING A MODULATED OPTICAL SIGNAL TO AN ELECTRICAL SIGNAL WITH CORRECTION FOR MODULATION JITTER

BACKGROUND OF THE INVENTION

This invention relates to applications of photodetectors and particularly to accurate conversion of detected optical information to electrical signals.

Modulated light sources are used in a variety of applications involving the detection of light reflected from or transmitted through an object, to determine certain properties or characteristics of the object. By way of example, a modulated near infrared light source may be used in connection with the determination of concentrations of various substances, or analytes, in the bloodstream of animals.

A common method of providing a modulated optical signal is to provide a continuous optical source and periodically interrupting the light from the continuous optical source with a chopper. The chopper may be, for example, a rotating segmented disk driven by an electric motor.

The use of a modulated optical source aids in distinguishing, in signal processing, the signal resulting from light from the source from noise and other signals. The signal is typically received at a photodetector, which converts all the optical information within a certain frequency range to an electrical signal. An electrical signal from a photo detector typically includes a large dark signal, a smaller optical-background signal, and a signal due to the source, which is smaller than both the dark signal and the optical-background signal. The use of a modulated optical source permits the use of signal processing techniques that can accurately identify the contribution to the electrical signal of the optical signal of interest. In addition, electronic techniques for processing modulated signals, which are AC signals, are more precise and accurate than techniques for processing unmodulated, or DC signals. It is well known that DC signals suffer from higher noise and larger drift than AC signals.

In the detection of optical signals in the near infrared range, in wavelengths from about 1,000 nanometers to about 2,500 nanometers, lead-sulfide (PbS) detectors are typically used. Within this frequency range, the frequency response is not flat. Alternatively stated, the ratio of the amplitude of the electrical signal output by the detector to the magnitude of the light received by the detector varies with the frequency of the light received.

As a result of the dependency of the response on frequency, any change in modulation frequency, or frequency jitter, causes a change in response, and thus an apparent change in the magnitude of the optical signal. In practice, the typical electro-mechanical system employed to produce modulation is subject to frequency jitter.

It is consequently an object of the invention to provide a method for converting a modulated optical signal to an electrical signal, while providing a flat frequency response.

A further object of the invention is providing a system for obtaining an electrical signal including apparatus for producing a modulated optical signal subject to frequency jitter and an apparatus for converting received signals to electrical signals with flat frequency response.

Additional objects and advantages of the invention will become apparent from the detailed description of the preferred embodiment which follows.

SUMMARY OF THE INVENTION

A method for converting to an electrical signal a modulated optical signal subject to variation about a predefined modulation frequency includes the steps of receiving the optical signal at an optical detector, producing as an output of the detector an electrical signal corresponding to the optical signal, the amplitude of the electrical signal varying with its frequency, adjusting the amplitude of the electrical signal in a predefined frequency-dependent manner, inversely to the variation of the amplitude of the electrical signal with frequency caused by the detector.

An apparatus for converting a modulated optical signal subject to variation in its modulation frequency includes an optical detector for receiving the optical signal and producing at an output an electrical signal corresponding to the optical signal, the amplitude of the electrical signal varying with the modulation frequency, an electrical circuit coupled to the output of the detector, the electrical circuit being adapted to vary the amplitude of the output electrical signal depending on the frequency of an input electrical signal.

A method for obtaining an electrical signal, the magnitude of which is representative of the characteristic of a physical body, includes the steps of irradiating the physical body with an optical signal, modulated at a modulation frequency varying within a narrow range, receiving the optical signal after interaction with the physical body and using a photodetector to convert the optical signal to an electrical signal, and adjusting the amplitude of the electrical signal in a predetermined manner depending on the frequency of the electrical signal, the predetermined manner being selected to correct for variation of the amplitude of the electrical signal with the frequency of the optical signal.

DETAILED DESCRIPTION OF A PREFERRED EMBODIMENT

Figure 1:
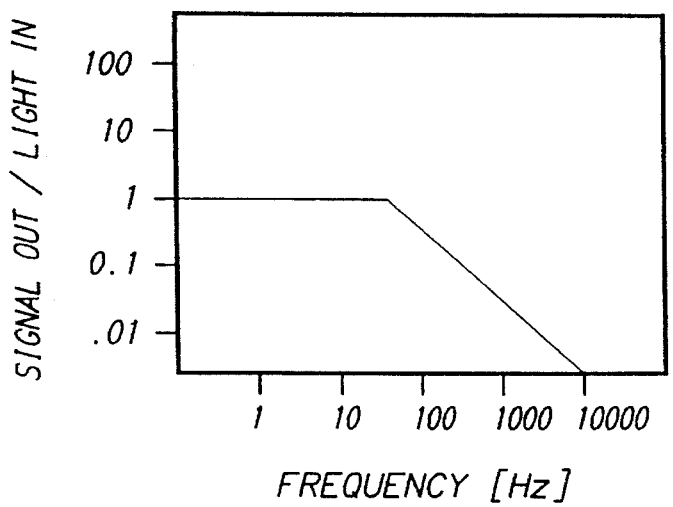
FIG. 1 is a graph showing the ratio of signal out to light in against frequency for a typical lead-sulfide photodetector.

Referring now to FIG. 1, there is shown the typical response of a lead-sulfide photodetector, as a ratio of electrical signal out to light signal received, as a function of the signal frequency in Hertz. Both axes are shown plotted on a base 10 logarithmic scale. As noted above, lead-sulfide photodetectors are the preferred detectors for converting near infrared optical signals to electrical signals.

Figure 2:
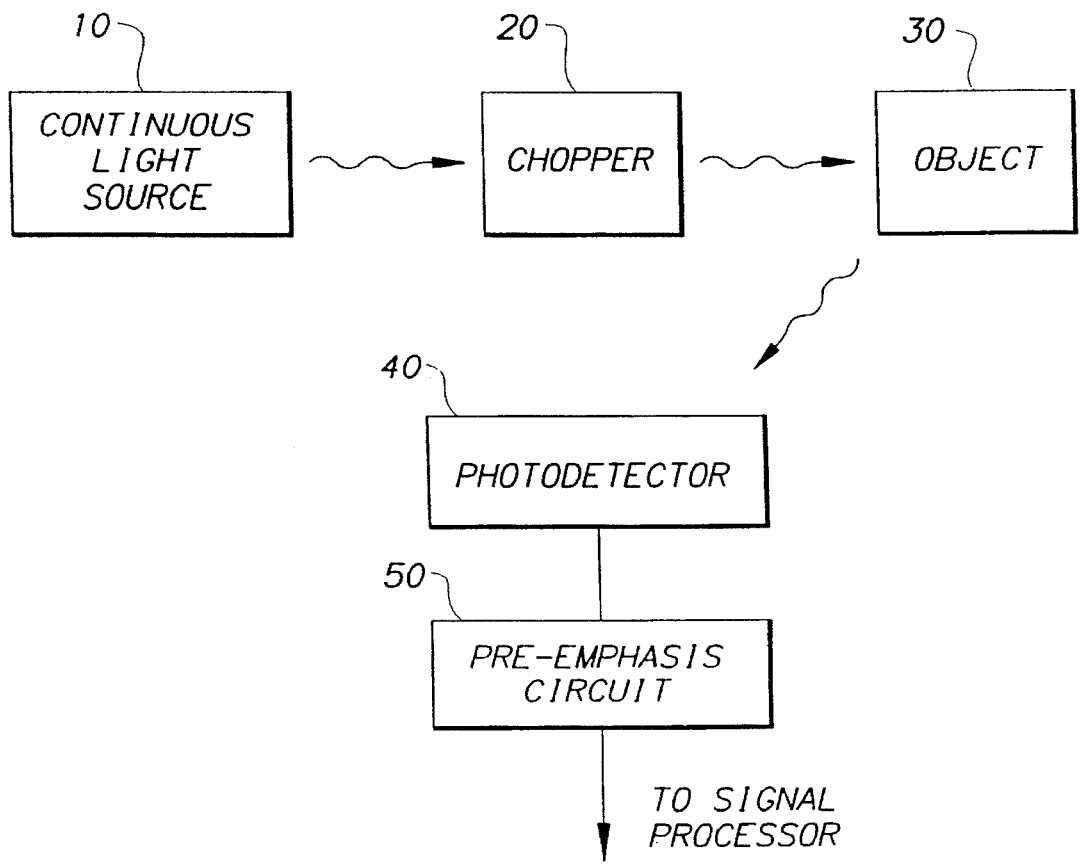
FIG. 2 is a schematic illustration of a system according to the invention.

Referring now to FIG. 2, there is shown, schematically, the method and apparatus for irradiating an object, receiving optical radiation emitted from the object, converting the emitted radiation to electrical signals, and compensating the output of the electrical signals. Continuous light source 10 may be an infrared radiation source. In the application in which the body of a mammal is irradiated with near infrared radiation to determine the concentration of analytes in the blood, the infrared radiation source is preferably a tungsten filament bulb which is maintained thermally isolated, with a constant current provided through the filament, and a infrared filter, to minimize the transmission of radiation outside the desired wavelength range. The infrared radiation source may, for example, provide radiation in wave lengths between about 1,000 nm and about 2,500 nm.

Light from continuous light source 10 is periodically interrupted by chopper 20. Chopper 20, may be, for example, a conventional rotating segmented disk. A simple electrical motor is typically provided to cause chopper 20 to rotate. As a result, the radiation emitted by continuous light source 10 is converted to a modulated near infrared signal. As will be readily appreciated, the use of a modulated signal permits separation of the signal from noise and background radiation. The modulated signal is then transmitted to object 30. In a typical application of the technique, the signal is transmitted by one or more optical fibers. As noted above, the object may be the skin of a mammal, although other applications of the method of the invention are possible.

Infrared radiation emitted from object 30 is then transmitted to photodetector 40. For example, pick-up optical fibers may be provided with one end in contact with or in close proximity to object 30, to receive radiation emitted from object 30. The pick-up optical fibers may be disposed to transmit radiation to a spectrometer, for spectrally separating the radiation and focusing the radiation on photodetector 40. By way of example, the spectrometer may be a unitary block of appropriate glass in a Czerny-Turner configuration. As noted above, photo detector 40 is preferably an array of lead-sulfide detectors. Photodetector 40 may also include pyroelectric detectors. In one typical example, the array may include 64 detectors. The spectrometer is preferably disposed with respect to the array to focus a selected portion of the spectrum on each individual detector. For example, a spectrometer may focus a portion of the spectrum covering a wavelength range of about 15 nm on each detector.

As noted above in connection with FIG. 1, the response of photodetector 40 varies with the modulation frequency of the infrared signal received from object 30. It has been found by the inventors that there is variation, or jitter, in the modulation frequency. This jitter is believed to be the result of the electro-mechanical system used to modulate the signal.

The output of photodetector 40 is coupled to the input of pre-emphasis circuit 50. The electrical signal from photodetector 40 is then transmitted to pre-emphasis circuit 50. In the embodiment where numerous photodetectors are provided, a pre-emphasis circuit 50 is coupled to the output of each photodetector. Pre-emphasis circuit 50 is characterized by a signal out to signal in response dependent on frequency, inversely to the response dependency characteristic of photodetectors 40. For example, where the response of photodetectors 40 decreases with increasing frequency, the response of pre-emphasis circuit 50 increases with increasing frequency. As a result, the signal output by pre-emphasis circuit 50, and transmitted to a signal processing apparatus (not shown), has a substantially flat response.

Figure 3:
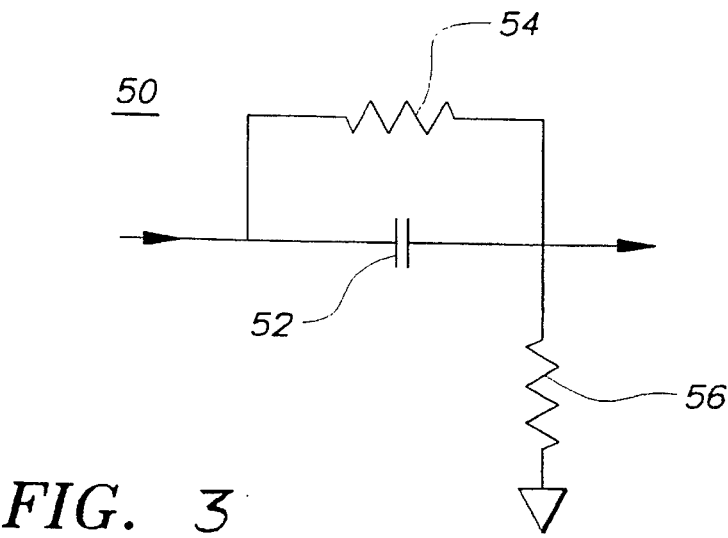
FIG. 3 is a circuit diagram of an exemplary pre-emphasis circuit in a system according to the invention.

Referring now to FIG. 3, there is shown a circuit diagram of a preferred embodiment of pre-emphasis circuit 50. There is shown a capacitor 52, having capacitance C, in parallel with a resistor 54 having resistance $R_1$. The output of pre-emphasis circuit 50 is coupled through resistor 56 having resistance $R_2$ to ground. The pre-emphasis circuit shown in FIG. 3 will generally have a response linear in frequency over a frequency range from about $R_1/C$, to about $R_1/R_2C$.

At the upper limit of this frequency range and above, the signal will not be attenuated across pre-emphasis circuit 50. At the lower end of this range, the ratio of output voltage to input voltage will be approximately equal to $R_2/(R_1+R_2)$. Thus, in order to obtain a large range, the resistance $R_2$ must be selected to be much lower than the resistance $R_1$. It will be understood that by suitable selection of the values of C, $R_1$ and $R_2$, a predetermined frequency-dependent adjustment of the magnitude of the photodetector electrical output signal may be selected.

In one embodiment of the invention, which is presented here for illustration only and not by way of limitation, it has been found desirable, with C equal to 0.1 microfarad, to provide $R_1$=68.1 K ohms, and $R_2$=5.23 K ohms.

Figure 4:
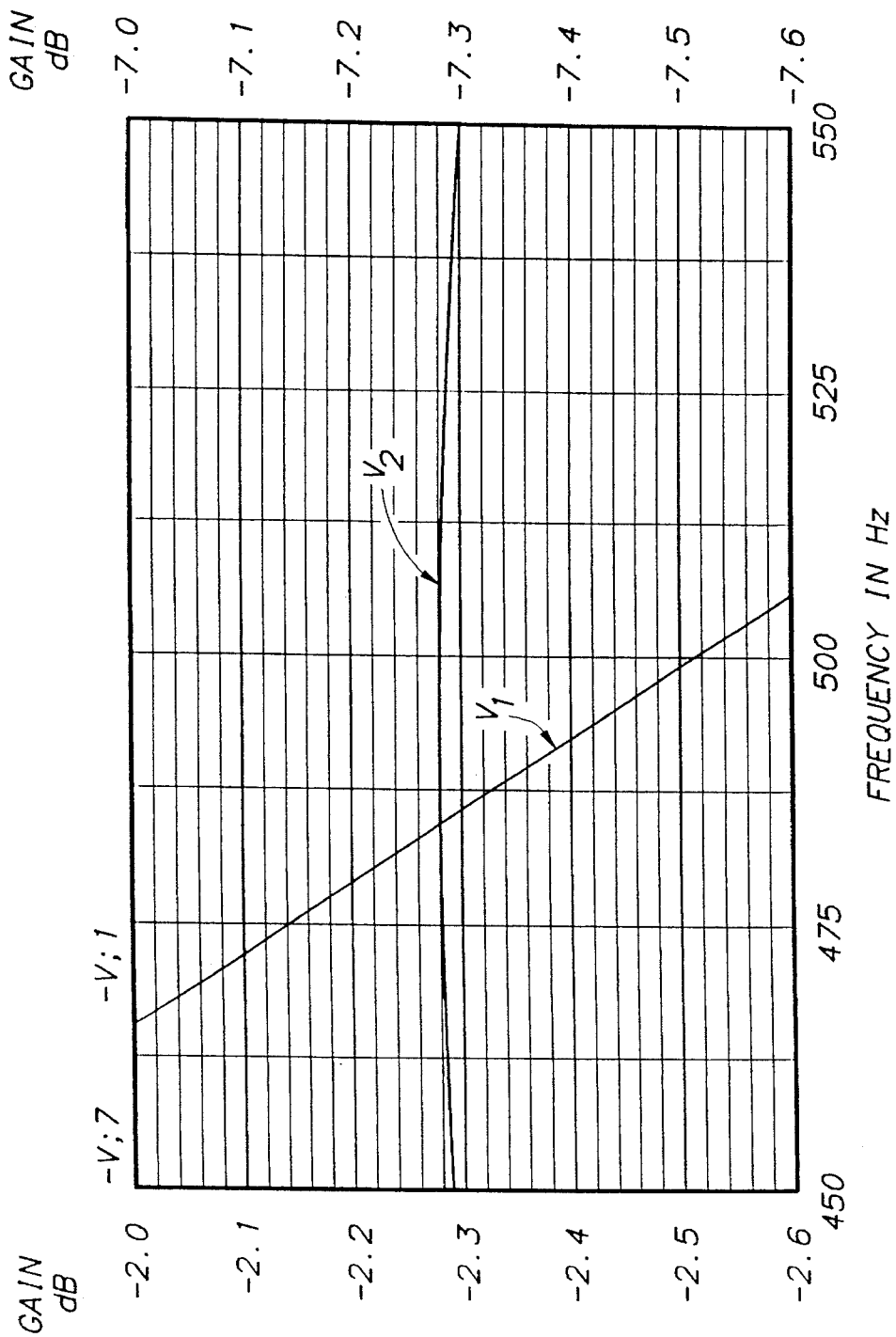
FIG. 4 is a graph showing the ratio of signal out to light in against modulation frequency for a photodetector both with and without the method of the invention.

Referring to FIG. 4, it will be seen that excellent results have been obtained using the method and apparatus of the invention to correct for the dependency of output signal strength on the modulation frequency around the 500 Hertz frequency. FIG. 4 shows the gain in decibels of the uncompensated signal, designated as V1 and the compensated signal, designated as V2. It will be noted that the gain of the compensated signal is substantially independent of changes in frequency over the range between 450 and 550 Hertz.

Figure 5:
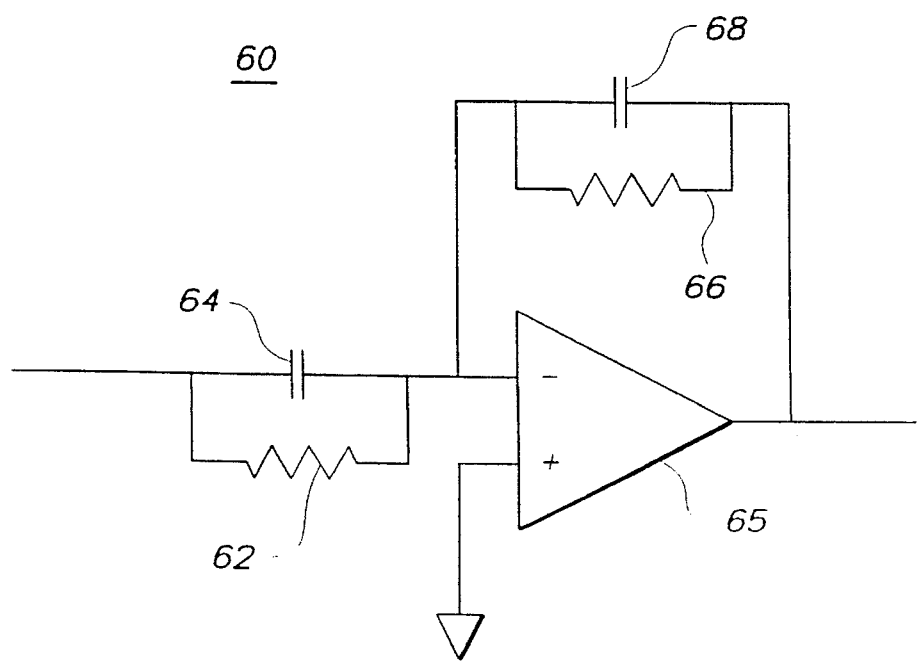
FIG. 5 is a circuit diagram of an alternative exemplary pre-emphasis circuit in a system according to the invention.

Referring now to FIG. 5, there is illustrated an alternative embodiment 60 of a pre-emphasis circuit according to the invention. The input of circuit 60 is coupled to first resistor 62 and first capacitor 64, which are in parallel. First resistor 62 has resistance $R_1$, and first capacitor 64 has capacitance $C_1$. The output of first resistor 62 and first capacitor 64 is coupled to the negative input of operational amplifier 65. The positive input of op-amp 65 is grounded. The negative input of op-amp 65 is coupled to the output of op-amp 65 across second resistor 66 and second capacitor 68, which are in parallel. Second resistor 66 has resistance $R_2$, Second capacitor 68 has capacitance $C_2$. The output of op-amp 65 is the output of circuit 60. It will be seen that the ratio of the output voltage to the input voltage of circuit 60 is $(R_2/R_1) \times ((R_1 \times C_1 \times S+1)/(R_2 \times C_2 \times S+1))$, where S is the complex modulation frequency. Those of skill in the art of electronic circuit design will be able to select resistors, capacitors, and the operational amplifier to obtain any desired relation between input and output voltage over a given range of frequencies.

It will be appreciated that there are considerable variations that can be accomplished in a method and apparatus of the invention without departing from its scope.

As a result, although a preferred embodiment of a method and apparatus of the invention has been described above, it is emphasized that the invention is not limited to a preferred embodiment and there exist other alternative embodiments that are fully encompassed within the invention's scope, which is intended to be limited only by the scope of the appended claims.

What is claimed is:

1. A method for converting to an electrical signal a modulated optical signal subject to variation about a predefined modulation frequency, comprising the steps of:

(a) receiving the optical signal at an optical detector;

(b) producing as an output of said detector an electrical signal corresponding to said optical signal, the amplitude of said electrical signal varying with its frequency;

(c) adjusting the amplitude of said electrical signal in a predefined frequency-dependent manner, inversely to the variation of the amplitude of said electrical signal with frequency of said step (b).

2. The method of claim 1, wherein said detector is a lead-sulfide detector.

3. The method of claim 1, wherein said step (c) comprises receiving the electrical signal output by said detector in a circuit comprising a first resistor and a second resistor in parallel, the output of said circuit being coupled to ground across a second resistor.

4. The method of claim 1, wherein the modulation frequency is about 500 Hertz.

5. The method of claim 1, wherein said step (c) comprises receiving the electrical signal output by said detector in a circuit having a circuit input and a circuit output, the circuit input being coupled across a first resistor and a first capacitor in parallel to a negative input of an operational amplifier, the negative input of the operational amplifier being coupled to the output of the operational amplifier across a second resistor and a second capacitor in parallel, the output of the operational amplifier being the circuit output.

6. An apparatus for converting a modulated optical signal subject to variation in its modulation frequency, comprising:
   (a) an optical detector for receiving the optical signal and producing at an output an electrical signal corresponding to the optical signal, the amplitude of the electrical signal varying with the modulation frequency;
   (b) an electrical circuit coupled to said output of said detector, said electrical circuit adapted to vary the amplitude of an output electrical signal depending on the frequency of an input electrical signal.

7. The apparatus of claim 6, wherein said optical detector is a lead-sulfide detector.

8. The apparatus of claim 6, wherein said electrical circuit comprises a first resistor and a capacitor in parallel, the output of said electrical circuit being coupled to ground through a second resistor.

9. The apparatus of claim 6, wherein said modulation frequency is about 500 Hertz.

10. The apparatus of claim 6, wherein said circuit comprises a circuit input and a circuit output, the circuit input being coupled to an input of an operational amplifier across a first capacitor and a first resistor in parallel, the input of the operational amplifier being coupled to its output across a second resistor and a second capacitor in parallel, the output of the operational amplifier being the circuit output.

11. A method for obtaining an electrical signal the magnitude of which is representative of a characteristic of a physical body, comprising the steps of:
   (a) irradiating the physical body with an optical signal, modulated at a modulation frequency varying within a narrow range;
   (b) receiving the optical signal after interaction with the physical body and using a photodetector to convert the optical signal to an electrical signal; and
   (c) adjusting the amplitude of the electrical signal in a predetermined manner dependent on the frequency of the electrical signal, said predetermined manner being selected to correct for variation of the amplitude of the electrical signal with the frequency of the optical signal.

12. The method of claim 11, wherein said photodetector is a lead-sulfide photodetector.

13. The method of claim 11, wherein said step (c) uses a circuit comprising a first resistor and a capacitor in parallel between an input and an output of the circuit, the output of the circuit being coupled to ground across a second resistor.

14. The method of claim 11, wherein said step (a) comprises irradiating the object with radiation in the wavelength range of about 1000 nanometers to about 2500 nanometers.

15. The method of claim 11, wherein said step (c) uses a circuit comprising a circuit input and a circuit output, the circuit input being coupled across a first resistor and a first capacitor in parallel to a negative input of an operational amplifier, the negative input of the operational amplifier being coupled to its output across a second resistor and a second capacitor in parallel, the circuit output being the operational amplifier output.

16. The method of claim 11, wherein said step (a) comprises irradiating the physical body with an optical signal at a plurality of wavelengths, each of said wavelengths being modulated at the same modulation frequency.

\* \* \* \* \*